(12) United States Patent
Trachy

(10) Patent No.: US 11,533,377 B2
(45) Date of Patent: *Dec. 20, 2022

(54) HYBRID CLOUD

(71) Applicant: Spectra Logic Corporation, Boulder, CO (US)

(72) Inventor: David Lee Trachy, Longmont, CO (US)

(73) Assignee: Spectra Logic Corporation, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/849,232

(22) Filed: Apr. 15, 2020

(65) Prior Publication Data

US 2020/0244756 A1 Jul. 30, 2020

Related U.S. Application Data

(63) Continuation-in-part of application No. 15/376,048, filed on Dec. 12, 2016, now Pat. No. 10,645,165.

(60) Provisional application No. 62/398,267, filed on Sep. 22, 2016.

(51) Int. Cl.
| | | |
|---|---|---|
| *G06F 15/16* | (2006.01) | |
| *H04L 67/563* | (2022.01) | |
| *H04L 67/1097* | (2022.01) | |
| *H04L 67/63* | (2022.01) | |
| *G06F 21/62* | (2013.01) | |

(52) U.S. Cl.
CPC ...... *H04L 67/2814* (2013.01); *G06F 21/6245* (2013.01); *H04L 67/1097* (2013.01); *H04L 67/327* (2013.01)

(58) Field of Classification Search
CPC . H04L 67/16; H04L 67/141; H04L 677/1097; H04L 45/24
See application file for complete search history.

(56) References Cited

U.S. PATENT DOCUMENTS

| | | |
|---|---|---|
| 9,848,228 B1 | 12/2017 | Morris et al. |
| 10,645,165 B2 * | 5/2020 | Trachy .................. H04L 45/24 |
| 2004/0109457 A1 | 6/2004 | Johnson et al. |
| 2013/0024722 A1 | 1/2013 | Kotagiri et al. |
| 2013/0042106 A1 | 2/2013 | Persaud et al. |
| 2014/0108665 A1 | 4/2014 | Arora et al. |
| 2014/0289839 A1 | 9/2014 | Chen et al. |

(Continued)

*Primary Examiner* — Yves Dalencourt
(74) *Attorney, Agent, or Firm* — Kenneth Altshuler

(57) ABSTRACT

A cloud environment is provided generally having at least one private data center possessing a controller/routing system and nonvolatile mass storage, a plurality of data objects retained in the nonvolatile mass storage, and a public cloud storage service provider linked to the controller/routing system. The public cloud storage service provider possessing a database containing policy decisions and metadata of the plurality of data objects. The private data center is not in possession of the policy decisions and the metadata for the plurality of data objects, rather the public cloud storage service provider is. The private data center in possession of the plurality of data objects, whereas the public cloud storage provider is not. The public cloud storage service provider adapted to be communicatively linked to an end-user computing system by way of the controller/routing system. The data center is independent of the public cloud storage provider.

20 Claims, 11 Drawing Sheets

(56) References Cited

U.S. PATENT DOCUMENTS

| | | |
|---|---|---|
| 2015/0154418 A1 | 6/2015 | Redberg |
| 2015/0222615 A1 | 8/2015 | Allain et al. |
| 2015/0373012 A1 | 12/2015 | Bartz et al. |
| 2016/0105488 A1* | 4/2016 | Thakkar ................. H04L 67/34 709/217 |
| 2016/0197835 A1 | 7/2016 | Luft |
| 2018/0247074 A1 | 8/2018 | Ancin et al. |

* cited by examiner

HYBRID CLOUD

CROSS-REFERENCE TO RELATED APPLICATIONS

This application is a continuation-in-part US Patent Application which claims priority to and the benefit of U.S. patent application Ser. No. 15/376,048 entitled Hybrid Cloud filed on Dec. 12, 2016, which claims priority to and the benefit of U.S. Provisional Patent Application Ser. No. 62/398,267, entitled Hybrid Cloud filed Sep. 22, 2016.

FIELD OF THE INVENTION

The present embodiments are directed to on-premise storage and cloud databases aligned in a hybrid storage arrangement that takes advantage of access flexibility of a public cloud with cost and performance advantages of private cloud storage.

DESCRIPTION OF RELATED ART

Cloud storage is becoming as ubiquitous as the computers that use it. Whether backup storage for a person's private cell phone, a laptop computer, or for a large company, cloud storage is changing the way people store and retrieve data. Cloud storage generally comprises one or more data servers, networks, storage, applications and services, etc. that pool storage resources accessible by a data consumer by way of the World Wide Web. Providers of cloud storage are tasked with keeping data available and accessible all of the time through maintenance and protection of a physical storage environment that is constantly running. Public cloud providers deliver scalable storage to multiple organizations through standardized cloud storage interfaces. The public cloud makes accessing data for thousands, if not millions, of users easy from essentially any location that has access to the Internet. Examples of public cloud storage providers include AWS (Amazon Wed Services) by way of the S3 interface, Dropbox, Google Drive, Microsoft Azure, Oracle Cloud, IBM's SmartCloud, just to name a few. The economic model behind public cloud storage is varied, but generally requires paying for the amount of data stored and the amount of data recalled and the speed of that recall. These charges are typically billed on a monthly basis. Though often public cloud storage providers offer a few gigabytes of storage in the cloud for free, their intention is to gain customers that desire to purchase larger amounts of storage capacity, hassle free. For that reason there are typically no upfront charges nor charges associated with moving data into the cloud. The public cloud offers many great advantages compared to on-premise storage by simply charging for by the amount of data retained in the public cloud and the amount of data accessed from the public cloud. Data stored in an on-premises storage device that adheres to one or more standardized cloud interfaces is called a private cloud. In contrast to public cloud private cloud, implementations usually require an upfront cost associated with the purchasing of the on-premises equipment and a yearly charge associated with the maintenance of that equipment.

It is to innovations related to this subject matter that the claimed invention is generally directed.

SUMMARY OF THE INVENTION

The present embodiments generally relate to a private cloud that utilizes a cloud database in a hybrid arrangement that takes advantage of the scalability and ease of use of public cloud storage with the performance and cost advantages of private cloud storage.

Certain embodiments of the present invention contemplate a storage arrangement comprising: a first private data center independent from and connected to a public cloud storage service, the first private data center possessing a controller and routing system and data storage capability; a data bucket maintained by the storage capability, the data bucket virtually containing a plurality of data objects, neither the data objects nor the data bucket is present in the public cloud storage service; a data bucket directory located in the public cloud storage service but not in the first private data center, the data bucket directory possessing location and directory information pertaining to the data bucket in the data objects; and data bucket handling policies for the data bucket retained in the public cloud storage service but not in the first private data center.

Yet other embodiments of the present invention contemplate a method of using a hybrid cloud network, the method comprising: providing a public cloud service linked to a first private data center, the first private data center possessing nonvolatile storage and a controller/routing system, the first private data center further possessing a data bucket that contains a first data object; entering the hybrid cloud network via a web address that is uniquely tied to the first private data center; requesting access to the first data object; after the requesting step, the first private data center determining that the first data object is located locally after receiving location information for the first data object from the public cloud service; and after the determining steps, providing access to the first data object.

While other embodiments of the present invention envision a method of handling data in a hybrid cloud network, the method comprising: providing a public cloud service linked to a first private data center, the first private data center possessing nonvolatile storage and a controller/routing system, the first private data center further possessing at least a first data bucket that contains at least a first data object, the first data bucket in the first data object not present in the public cloud service; a first end-user entering the hybrid cloud network via a web address that is uniquely tied to the first private data center; the first end-user gaining access to the first data bucket; the first end-user requesting access to at least a portion of a directory for data objects in the first data bucket; the first private data center seeking the portion of the directory from a data directory retained in the public cloud service for the first end-user in response to the requesting access; after gaining access to the portion of the data directory, the first end-user requesting access to the first data object; after the requesting step, the first private data center determining that the first data object is located locally after receiving location information for the first data object from the public cloud service; and after the determining steps, providing access to the first end-user to the first data object.

And still, other embodiments of the present invention envision a storage arrangement comprising: a private data center possessing a master controller/routing system and nonvolatile mass storage; a plurality of data objects retained in the nonvolatile mass storage; a public cloud storage provider linked to the master controller/routing system, the public cloud storage provider possessing a database logically containing policy decisions and metadata of the plurality of data objects, the public cloud devoid of any possession of the data objects, the data center devoid of any possession of the policy decisions and the metadata of the plurality of data objects, the public cloud storage provider adapted to be communicatively linked to an end user computing system by way of the master controller/routing system, the data center is independent of the public cloud storage provider.

Additional embodiments of the present inventions contemplate a storage arrangement comprising a private data center possessing a controller/routing system and nonvolatile mass storage; a plurality of data objects retained in the nonvolatile mass storage; and a public cloud database service/provider linked to the controller/routing system, that database logically containing policy decisions and metadata of the plurality of data objects, the public cloud devoid of any possession of the data objects, the data center devoid of any possession of the policy decisions and the metadata of the plurality of data objects, the controller/routing system adapted to be communicatively linked to an end-user computing system by way of the controller/routing system through a standardized cloud storage interface.

Yet other embodiments of the present invention can therefore comprise a method comprising steps for providing a first data center possessing a first controller/routing system and non-volatile mass storage; connecting the first controller/routing system to a public cloud database provider; storing a first data object to a data bucket, the first data object and the data bucket retained in the nonvolatile mass storage, but the first data object never existing in the public cloud; storing policy decisions, directory information and metadata corresponding to the first data object to a first database retained in the public cloud database, the first database never fully retained in the first data center; and the controller/routing system managing a data consumer request to access the data bucket by receiving all pertinent information related to the request from the public cloud database and then acting upon this information to fulfill the request.

And, yet other embodiments of the present invention contemplate a storage arrangement comprising a first data center independent from and connected to a public cloud database provider by way of a first control path, the first data center possessing a controller and routing system and data storage capability; a first end-user connected through an end-user computer system by way of a first data path to the controller and routing system and indirectly to the public cloud storage provider/service by way of the first control path; a data object stored in nonvolatile memory in the first data center, but not stored in the public cloud; metadata corresponding to the data object retained in the public cloud database as long as the data object exists in the first data center; and policies for the data object retained in the public cloud database, the metadata and the policies retained in the public cloud database as long as the data object exists in the first data center, the policies and the metadata are retained in the first data center for an abbreviated amount of time where it is actively used. One example of an abbreviated amount of time is envisioned to be as less than one quarter of the time the data object is retained in the first data center, which can be considered ample time to utilize the policies without permanently retaining them in the first data center.

DETAILED DESCRIPTION

Figure 1:
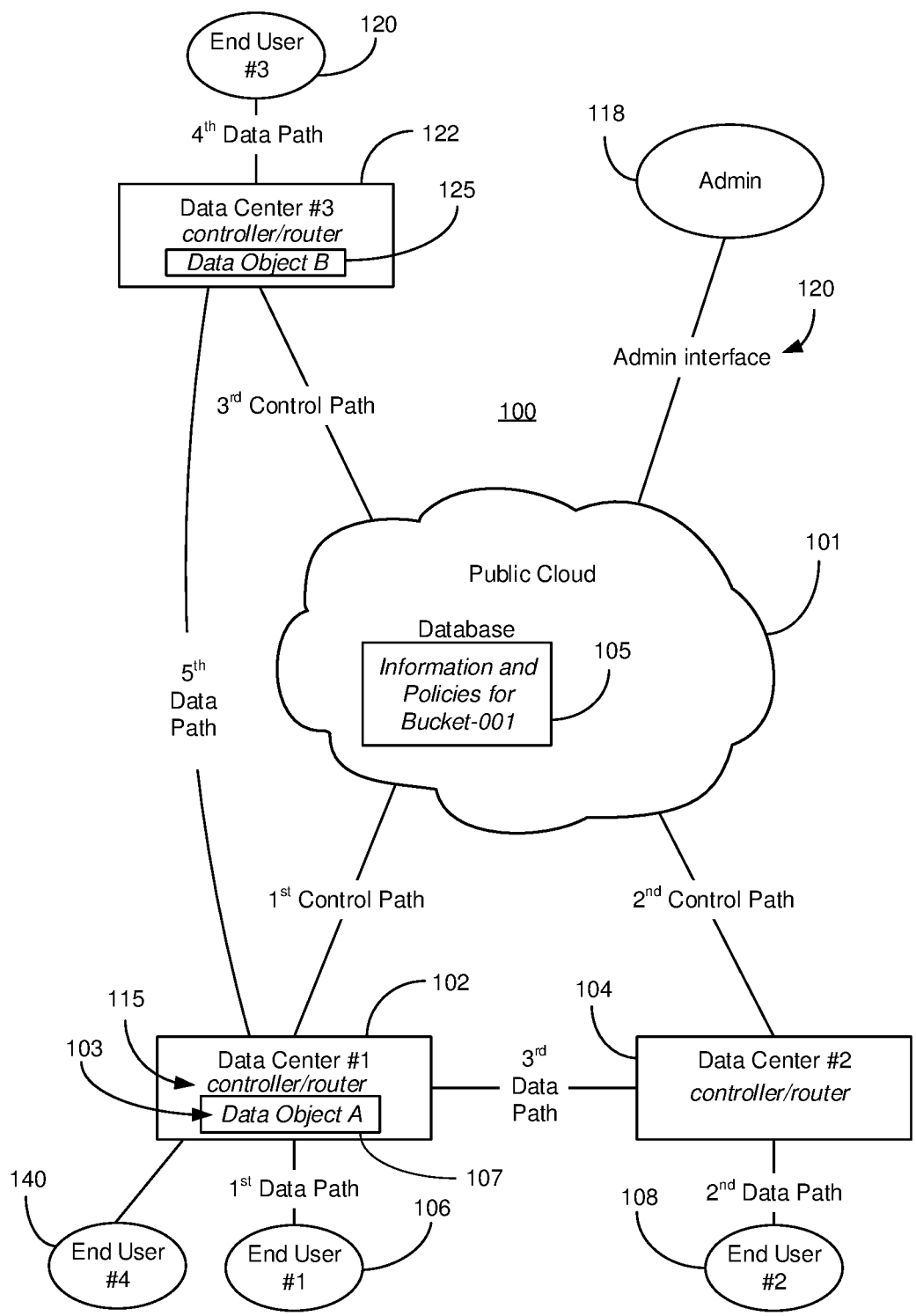
FIG. 1 depicts a block diagram of a storage system embodiment consistent with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of public clouds with independent data centers. In what follows, similar or identical structures may be identified using identical callouts.

Certain elements described in the below embodiments of the present invention utilize elements that a skilled artisan will understand is generally interpreted as follows. A data center includes one or more computing systems that has storage capability for retaining large amounts of data, such as by way of hard disk drive servers, for example. A private data center is a data center that has an infrastructure dedicated to a private entity, access is limited to the private entity that is under control of a private entity and limited to access by the private entity. A private data center can be the driving engine behind a private cloud that is accessible from remote nodes, such as over the Internet for example. A public data center is a data center that does not have a dedicated infrastructure to a private entity, but rather is openly accessible to anyone, i.e., "the public". Open accessibility could be free, but generally is for hire. A public cloud is typically made up of a plurality of public data centers accessible to the public, typically for hire.

One of the primary differences that distinguishes a public cloud from a private cloud is that the goal of a public cloud is to offer computing services including storage to essentially anyone for a fee (it is essentially purely to make money in exchange for storage) in contrast to a private cloud which is dedicated to a private entity/s (user/s) to maintain private data. Hence, a public cloud exists to make money by managing and maintaining storage for whoever is willing to pay whereas the goal of a private cloud is to provide a private storage resource (i.e., not a resource for anyone so long as they are willing to pay). Likewise, a private data center provides computing and storage exclusively to a private person or persons and is not for sale to anyone interested in purchasing storage space. A public data center provides computing and storage to anyone (the public) willing to pay for storage space in the public data center. With this in mind, a public cloud storage service is a software platform offered in the public cloud that provides data management as a service for each of the many clients that are paying (public cloud storage service) to have their data managed.

A data bucket as used herein is a dedicated data space made up of at least a portion of a physical non-transient storage device, which in this case is located in one or more private data centers. A data bucket is not necessarily tied to any specific individual storage devices (such as an HDD, SSD, tape cartridge), but can include portions of a plurality of different storage devices, the portions collectively making up the data bucket storage space. Each data center can comprise a plurality of data buckets each of which can be dedicated a collection of related data (e.g., data collected in a specific date range, of a specific event, for specific user, from a specific region, a specific task or set of tasks, etc.). Because a data bucket is essentially a virtual storage container, it need only have a unique identification at a minimum. A data bucket can be a predetermined data size (i.e., capable of containing a predefined number of data bits) that is the same size as other data buckets or optionally a different size as the other data buckets. A data bucket can be adjustable in size to accommodate the amount of data stored in the data bucket.

Object storage bundles one or more pieces of data in a structured manner with all associated metadata and designates it as an object. Object data is a distinct unit of data that includes the unstructured data itself, the variable amount of metadata and a globally unique identifier. Because object storage adds comprehensive metadata to the object, the tiered file structure used in file storage is eliminated. Objects can be managed by way of a flat address system instead of a hierarchical address system as used in a file system. Object storage systems allow retention of massive amounts of unstructured data. Object storage is used for purposes such as storing photos on Facebook, songs on Spotify, or files in online collaboration services, such as Dropbox.

FIG. 1 is a block diagram of a cloud network storage arrangement 100 where embodiments of the present invention can be practiced. As depicted, the cloud network storage arrangement 100 comprises a first data center 102 that is connected to a public cloud database service provider (or simply public cloud) 101 by way of a first control path. The first data center 102, in certain embodiments, is a private data center that is independent of the public cloud 101. In other words, the first data center 102 is not owned or managed by the public cloud service provider 101, rather it is owned by a private person or organization that is not providing services to the general public. The public cloud 101, being public, services entities (as a business model) outside of the cloud network storage arrangement 100. However, though a number of different entities can access the public cloud 101 those without the proper credentials cannot enter the cloud storage arrangement 100. Though a data path or a control path can pass through any number of junctions or obstacles, it is considered a point to point path between a first data center and another data center. Hence, for example, the first data center 102 would have a first data center web address and the first end-user 106 would have a first end-user web address. The first data center 102 is connected to a first end-user 106, who is a consumer of data, through the first data center's controller and routing system 115 by way of a first data path. The controller/routing system by way of a web address is considered a means for linking the first end-user 106 to the first data center 102. Other embodiments contemplate the controller/routing system being the means for orchestrating communication between a data center and an end-user and/or a data center and the public cloud storage service provider 101, as well as a means for directing data objects to storage to a predefined data bucket, as well as a means for transmitting metadata corresponding to a first data object to a database managed by the public cloud storage provider, as well as a means for receiving and executing policy decisions in a data center received from the public cloud storage provider.

The first end-user 106 can be a server running an application interface program (API), a server running an API with a GUI (graphical user interface) accessible by a person, a server linked to a computer with a GUI, etc. APIs are used to build applications in the cloud market as well as interface with a cloud service. Given that controller/router 102 presents a standard cloud storage interface to end-user 106, any application that is capable of using that interface will be able to run without modifications and without being cognizant that this is a private cloud environment (i.e., through a public API). As discussed above, cloud APIs allow software to request data and computations from one or more services through a direct or indirect interface. Cloud APIs most commonly expose their features by way of representational state transfer (REST), which is the software architecture style the World Wide Web, or simple object access protocol (SOAP), and the like.

The first data center 102 can include a server, one or more storage repositories (storage system such as containing hard disk drives (HDDs), solid state drives (SDDs), tape, or other types of mass storage within the scope and spirit of the present invention. The first data center 102 (and all other data centers) possess a controller and routing system 115 that functions as the brains of the data center 102. The controller and routing system 115 possesses appropriate hardware and an adequate computing system (known to those skilled in the art), which can be programmed to direct communication between the public cloud 101 and end-users, as well as direct communication with other data centers. The controller/routing system is a means for orchestrating communication between data centers, an end-user and the data center, the data center and the public cloud as well as manage storage internally in the data center, in addition to other functions.

As depicted in the embodiment of FIG. 1, Data Object A 103 is stored in a storage repository in the data center 102. Information related to Data Object A 103 (such as metadata, location data, data from all transactions related to Data Object A 103, etc.) and policies for Data Object A 103 are retained in the public cloud 101 in a database 105 specific to a data bucket 107 that contains Data Object A. A data bucket is a virtual repository that contains one or more data objects, often related, that are grouped together. Certain embodiments envision information related to Data Object A 103 including metadata about Data Object A 103, location of Data Object A (i.e., in the first data center 102), security protocols to access Data Object A, for example Amazon's Web Services (AWS) authentication from Amazon, Corp. Metadata can include a number of different attributes and parameters about a data object including, but not limited to object location/s, migration information, access information, time and dates of activities related to a data object, replication information, etc. Policies for Data Object A 103 can include which end-users are allowed to access Data Object A 103, what level of access is permitted for an end-user regarding Data Object A, security key for authorization to access Data Object A 103, where and when Data Object A 103 can be moved or copied to another location, for example.

Also depicted, are a second data center 104 (all data centers are considered independent of the public cloud 101) connected to the first data center 102 via a third data path and a third data center 122 connected to the first data center 102 by way of the fifth data path. A third end-user 120 is connected to the third data center 122 via a fourth data path. The third data center 122 is connected to the public cloud 101 by way of the third control path. A second end-user 108 is connected to the second data center 104 by way of a second data path. The second data center 104 is connected to the public cloud 101 by way of a second control path. Lastly, an administrator 118 is connected to the public cloud 101 via an interface communication path. One skilled in the art will appreciate that each of the "nodes" (e.g., public cloud, admins, data centers, and end-users) typically all comprise computing systems. In the present embodiment the data centers possess at least a router and controller (functions), which can be a standalone system like the White Pearl controller system manufactured by Spectra Logic of Boulder, Colo. The router and controller functions facilitate directing information about data objects to the public cloud 101 and/or data objects to other data centers as well as carrying out policies maintained by the public cloud 101. Also, the present embodiment envisions that the database 105 is not retained in long-term memory in any of the data centers. Certain embodiments envision aspects/portions of the database 105 being retained in at least one of the data centers in short-term memory, such as minutes, hours, a day or even maybe a week, but not for months or years. Other embodiments contemplate that portions of the database 105 being purged from the data center on a regular basis. One reason a public cloud database is utilized is that the database 105 needs to be highly resilient and available, which would require substantial hardware and software assets if hosted within one of the data centers while another reason is that all data centers need access to a centralized database such that they can provide a consistent view of the state of all data objects in the system 100. Other certain embodiments envision only a portion of the database (only that which is needed to fulfill necessary information to complete a transaction) being transmitted from the public cloud 101 to a data center. Yet other embodiments contemplate that the portion of a database, i.e., specific records needed to complete a transaction, are only retained by a data center until the transaction with an end-user is complete (over), at which point the specific records are dumped (purged from the data center). The entirety of the database, in all embodiments, is exclusively located in the public cloud 101.

Figure 2:
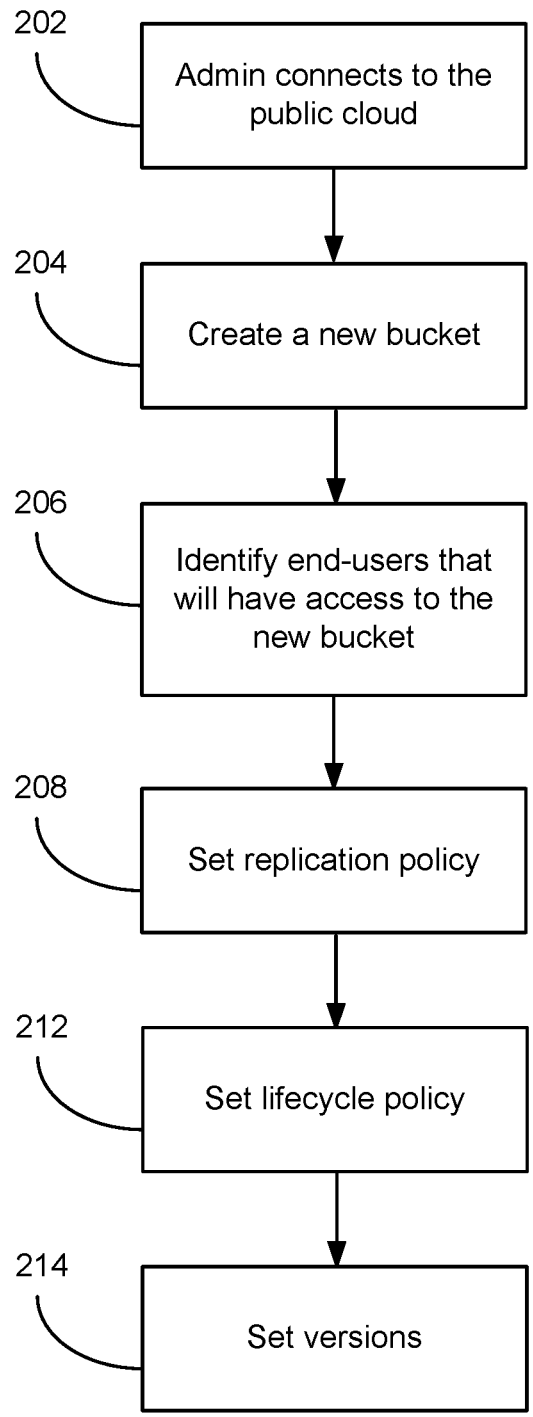
FIG. 2 is a method embodiment for setting up the public cloud for use with one or more data centers consistent with embodiments of the present invention.

FIG. 2 is a method embodiment for setting up the public cloud 101 for use with one or more data centers consistent with embodiments of the present invention. FIG. 2 is described in view of FIG. 1 and FIGS. 3A and 3B. In step 202, an administrator 118 runs a standard web browser, for example M.S. Internet Explorer, Chrome, Safari or others, which connects to the public cloud 101 via a web server interface 120. An administrator 118 has the master authority to perform bucket creation, security, policy, etc. Certain embodiments envision an administrator being an operator/person(s) that sets up policies, security, data location information, and other storage related functionality retained in the public cloud 101 for data objects stored in data centers. Policies in the public cloud 101, set by an administrator with authority, can include various data migration policies, level of access to particular data objects by various end-users, directories/objects allowed to be viewed by various end-users, etc. The administrator 118 has to be identified as an authority to create or alter the policy 105 for a given data bucket. Authority could be granted based on username and password, fingerprint, or some other form of identification.

Figure 3A:
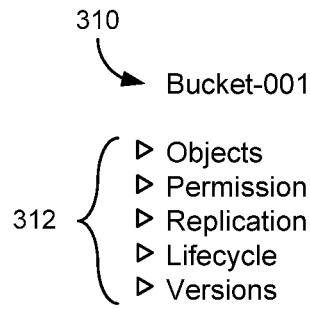
FIGS. 3A and 3B depict an example of input elements displayed by an interface program that an administrator can use to manage functionality of a public cloud database for a bucket embodiments of the present invention.

FIG. 3A depicts an example of input elements displayed (by an interface program) for an administrator 118 to manage functionality of a public cloud database for a bucket. In this example, after the administrator 118 is connected to the public cloud 101, the administrator 118 creates a data bucket ("Bucket-001" 310) comprising database information retained in the public cloud 101. The database provides management based on policies for the associated data objects that are logically retained in (virtual) data buckets in the data centers. A data bucket, or simply bucket, is analogous to the term "folder" used in Microsoft Windows. In the present embodiment, the administrator 118 is provided with a group of visual set-up options 312 for Bucket-001 310 displayed on a graphical user interface (GUI), such as a screen, and accessible and able to be manipulated via a mouse, and keyboard comprised by a computing system. In FIG. 3A, the GUI displays set-up options 312 in collapsed form as depicted by the arrow heads pointing towards each set-up option. Certain other embodiments contemplate different set-up options including replication, security levels, etc.

Figure 3B:
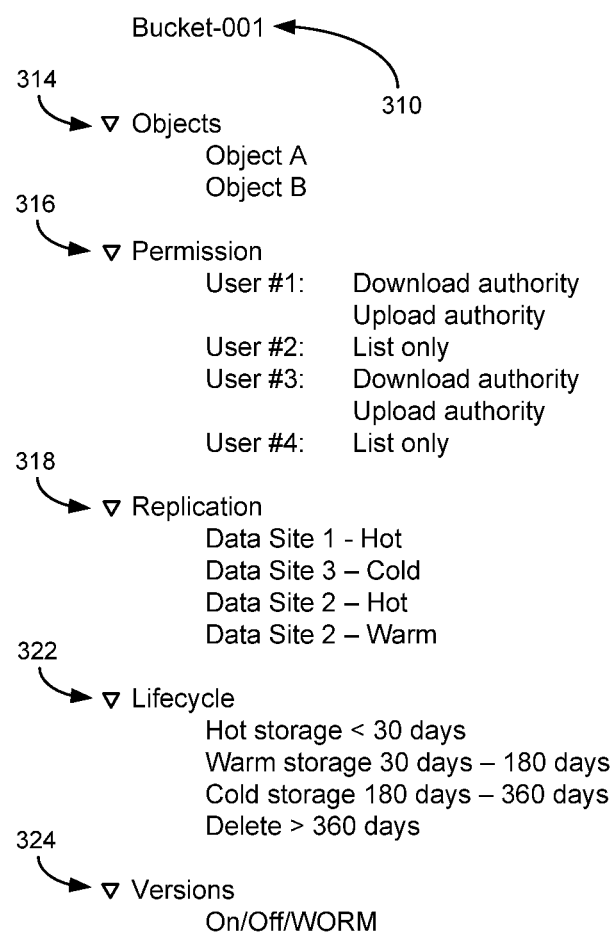

FIG. 3B depicts an embodiment of an expanded view of the set-up options 312 is arranged consistently with respect to FIG. 1. These set-up options when inputted establish the policy decisions for any particular data bucket, or more specifically, all of the data objects in the data bucket. Though originally there will be no objects in the objects set-up option 314, any object ultimately loaded into Bucket-001 310 will appear under the objects tab 314. The administrator 118 (or a different authorized administrator) can come back any time and adjust the set-up options 312 for Bucket-001 310. Opening up the permission tab 316, the administrator 118 identifies (e.g., enters in, locates, etc.) known users and grants the known users varied degrees of accessibility for a given data object, i.e., varied degrees of access permission. In this embodiment, User #1 is granted enhanced permission to download data objects from Bucket-001 310 and upload new data objects to Bucket-001 310, User #2 is granted list only permission, User #3 is granted enhanced permission to download data objects from Bucket-001 310 and upload new data objects to Bucket-001 310, User #4 is granted list only for Bucket-001 310, step 304. The present embodiment envisions that only the end-users expressly identified in the permission tab 316 will have some level of access to Bucket-001 310. In other words, if an end-user is not expressly identified in the permission tab 316, they will not have access to Bucket-001 310, or in certain embodiments an unidentified end-user will not even be able to see Bucket-001 310 in a directory provided by the cloud network storage arrangement 100. Other embodiments contemplate permission options wherein an end-user is identified and expressly denied any access to a specific bucket.

In the expanded view of the replication tab 318, the administrator 118 creates policies that the data objects contained in Bucket-001 310 are to be replicated at Data Center #1 102, Data Center #2 104 and Data Center #3 122, step 208. Not only are the data objects from Bucket-001 310 replicated in data centers #1 102, #2 104 and #3 122, the administrator 118 can set generating multiple copies of the data objects in each data center 102, 104 and 122, just in case one of the data objects becomes damaged or lost. Moreover, each data center can comprise different categories of storage capability, or storage categories, such as "hot", "warm", and "cold" storage based on data access, storage capacity levels, storage security levels, etc. In this case, Data Center #1 102 maintains one copy in "hot" storage, Data Center #2 104 maintains two copies (one in "hot" storage and one in "warm" storage), and one copy maintained in "cold" storage at Data Center #3 122. Because the administrator 118 can set replication of data objects and redundancy of data objects, if the administrator 118 does not set any redundancy or replication of one or more data objects and the data object/s become lost or damaged, there will be no copy to reconstruct the data object/s. "Hot" storage is considered storage that provides essentially the fastest storage access to data available within a storage data center. For example, "hot" storage might comprise enterprise level hard disk drives or solid-state drives or some other high-end, typically expensive storage device. Because "hot" storage is typically an expensive storage resource to maintain data, it is suboptimal to retain data in "hot" storage for data that is infrequently used or retained for the long term. "Warm" storage is considered storage that provides medium grade storage access to data within the data center. For example, "warm" storage might comprise standard hard disk drives or shingled media recording (SMR) hard disk drives or some other random access midgrade storage device that is less expensive than "hot" storage. Because "warm" storage is typically less expensive than "hot" storage, but is still reasonably fast for storing and receiving data, "warm" storage is a reasonably good choice for storing less frequently used data. "Cold" storage is considered storage that provides long time, inexpensive, and low energy consumption data storage such as, tape storage or optical disc storage, and the like. Because "cold" storage is typically a low-cost/low energy storage solution that takes longer than "hot" or "warm" storage to retrieve data, "cold" storage is better suited for long-term storage that seldom requires data retrieval. "Cold" storage is considered long-term archive storage.

The lifecycle tab 322 permits the administrator 118 to choose how long a data object is retained in various forms of storage, step 212. In this example, data objects are automatically moved/migrated after 30 days from "hot" storage to "warm" storage. The administrator 118 can set up policies whereby data objects are automatically moved after 180 days from "warm" storage to even lower cost "cold" storage options, sometimes called "glacier storage". In this example, the administrator 118 sets a policy that data objects are automatically deleted after 360 days. The last tab displayed in this embodiment is the versions tab 324 wherein the administrator 118 can set the method of versions of a common data object in Bucket-001 310, step 214. Certain embodiments envision migrating from higher tier storage, e.g., "hot" storage, to lower tier storage, e.g., "cold" storage, taking place essentially as soon as a data object is received and only deleting from a higher tier storage after reaching migration deadlines. For example, consider a scenario whereby a data object C is initially stored to "hot" storage and replication policies provide instructions for data object C to be migrated to "warm" storage after 30 days and then "cold" storage after 180 days. Instead of waiting until 30 days to migrate data object C to "warm" storage (and delete from "hot" storage) and 180 days to migrate data object to "cold" storage (and delete from "warm" storage), data object C will be stored to all storage three storage tiers at essentially the same time, or when it is convenient for the data center to store data object C to "warm" and "cold" storage. Only after 30 days will data object C be deleted from "hot" storage, and only after 180 days will data object C be deleted from "warm" storage. In this way, there will be three redundant copies of data object C when retained to "hot" storage and the migration activity is already done. This can be performed with the knowledge of the administrator and organized in the bucket policies, or optionally without the explicit knowledge of the administrator and devoid in the bucket policies. Though the above example describes time from when the data object was first stored as a threshold parameter, other threshold parameters that can be used to trigger the migration of data includes elapsed time when a data object was last accessed, frequency of how often the data object is accessed, etc.

When the versioning is selected to be on, an original object can be updated whereby the updated version is saved as an additional object under a common name or indicia. For example, original data object 050.A can be updated with some changes and saved as version 050.B and an additional change to data object 050.B is saved as version 050.C, and so on. Some embodiments envision all versions being retained for legacy purposes. Some embodiments contemplate certain versions being deleted for any number of reasons including time expiration, deletion after a set number of subsequent versions are saved, every other/odd version deleted, etc. When versioning is set to off, there are simply no versions of a data object beyond the single data object. For example, data object 050.A can be updated with the changes saved as data object 050.A. All legacy versions of data object 050.A are lost. When versioning is set to Write Once Read Many, any particular version cannot be altered. Though the above example illustratively depicts five policy tabs, the number of policy tabs is not so limited. Any number of tabs and policies (fewer or more) can be provided or created within the scope and spirit of the present invention.

As exemplified above, policies can have any number of variations. For example, policies can be set for one end-user having data object editing authorization and ten other end-users have list-only, or perhaps read-only access. Or, optionally, ten end-users being given editing authorization. For example, imagine a newsfeed coming from a news station in Los Angeles for distribution to sister news organizations in other cities. Policies can be set whereby other end-users can only have read access to the newsfeed (data object/s). In this example, the news feed is not intended to be synchronized with other news feeds, rather it is just for distribution. In other words, the parent company would likely not want the newsfeed edited or updated by a sister news station elsewhere (like in Boston, or some other location). This is accomplished by setting permission to a particular bucket containing the news feed accessible by various users in various cities.

Figure 4:
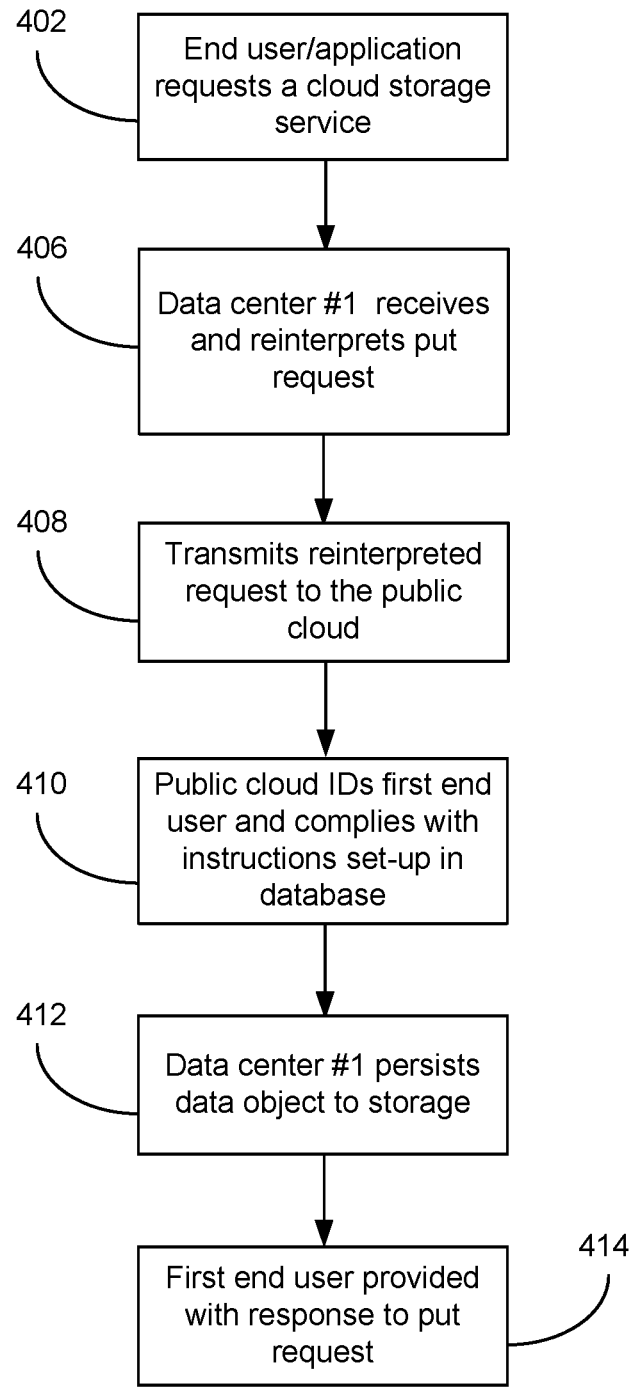
FIG. 4 is a method for creating data objects by end-users, considered a "put" herein, consistent with embodiments of the present invention.

FIG. 4 is a method for creating data objects by end-users, considered a "put" herein, consistent with embodiments of the present invention. In this example, FIG. 4 is described in view of FIG. 1. The first end-user 106 must first gain access to the cloud storage service 101 in order to gain access to Bucket-001 database 105 before uploading any data objects to Data Center #1 102 in Bucket-001. Accordingly, the first end-user 106 connects to Data Center #1 102 (or more specifically to the data center's controller/routing system 115) by way of a first web address, or some other method of linking to the site 102. In this example, the first end-user 106 is a person/operator connected to Data Center #1 102 by way of the first data path, however, other embodiments contemplate an end-user being an application (computer application) that essentially interfaces with the database 105 to automatically upload data objects for storage at the first web address. The first end-user 106 does not necessarily know that they are connecting to Data Center #1 102 (#2 104 or #3 122, for that matter), rather the first end-user 106 simply knows that there is storage behind the first web address able to store new data objects (and possibly containing other data objects), which in certain embodiments appears to be the public cloud storage service to the first end-user 106. The first end-user 106 communicates with Data Center #1 102 (controller/routing system) via their local computer by way of a REST interface that may be accessible through an application programming interface (API) that in certain embodiments is a well-established public interface program, such as Amazon Simple Storage Services (S3) for cloud storage. A public interface program is an interface program that is used by a general consumer. In the present embodiment, the local computer is engaged in a stateless connection through REST protocol with Data Center #1 102 whereby every communication transaction with Data Center #1 102 requires authorization because after each transaction the communication link is closed. A typical communication transaction is a communication packet that is sent and often comes back with confirmation. This is accomplished by the local computer wrapping authorization codes associated with the first end-user 106 with each data communication transaction that it transmits. However, the first end-user 106 being logged into the local computer does not know that communication is by way of REST protocol. Other embodiments envision a connection that is not stateless whereby the first end-user 106 has an open link with Data Center #1 102.

Based on the policies set up by the administrator 118, the first end-user 106 is allowed to enter the cloud network storage arrangement 100 via their local computer by way of medium level security, which could be a username and password, for example. Certain embodiments contemplate the first end-user 106, through their local computer, being allowed to enter the network with simply an IP address or a different username and password, but may not be allowed to view Bucket-001 310 unless a specific medium level security access code is provided. For simplicity sake, consider the first end-user 106 being the local computer for purposes of continued descriptions.

In the exemplified embodiment, the first end-user 106 communicates with Data Center #1 102 over the first data path via a publically used API protocol (e.g., S3), but Data Center #1 102 communicates with the public cloud 101 over the first control path via a private control protocol (a protocol that is not used by the general public, but rather is specific to the data center/public cloud relationship), that in the present embodiment interacts by way of REST protocol, specific for communication between a data center and the public cloud 101, that is different from the public API protocol. Certain other embodiments envision the control paths not being a stateless connection. Accordingly, the computer system in Data Center #1 102 must convert (using its controller/routing system 115, or other computing system within the data center) the information (a PUT request) received from the first end-user 106 (in the public API protocol) to the private control protocol that the public cloud computer system (not shown) can understand, step 406. The converted information provided by the first end-user 106 is then transmitted to the public cloud 101, step 408. Hence, the first end-user 106 communicates with Data Center #1 102 by way of a public API over the first data path, but Data Center #1 102 communicates with the public cloud 101 by way of a private control protocol via the first control path. The request to perform a PUT will require being wrapped with authorization codes that will require being translated to the control protocol by Data Center #1 102, in this particular embodiment.

Based on the permission policy 316 originally set up by the administrator 118 (which is stored in the public cloud 101), assume the first end-user 106 is authorized to upload and download (and view specific contents of) Bucket-001 310 as depicted by the permission tab 316, step 410. Accordingly, the first end-user 106 after generating a new data object can upload that data object under a specific new data object name (such as a file name, for example), that is stored to Data Center #1 102, which is the target location of the web address used by the first end-user 106. Though the data object is stored to Data Center #1 102, metadata about the data object including location where the data object is stored is sent to the public cloud 101 to be stored in the database for Bucket-001 105. Likewise, the first end-user 106 is authorized to view a desired data object, download the desired data object to their local computer, edit the data object, and upload a new version of the data object back to Data Center #1 102. Certain embodiments envision the public cloud downloading a relevant portion of the database 105 (that information which is required by the end-user, such as, pertinent directory information, replication information, etc. directed to the data object/s being used by the end-user) to a data center, which can be retained in buffer memory in the data center, for a window of time the end-user will likely need to ask is that portion of the database. The window of time could be minutes or even perhaps weeks long. The window of time used to buffer relevant portions of the database 105 in a data center avoids going back and forth with the public cloud 105 over data buckets and data objects an end-user is currently working on. After the window of time an end-user is not accessing bucket/s and data objects, relevant portions of the database 105 are deleted. The intent is to avoid storing a copy of the database 105 in a data center, given that the database 105 could accommodate records of millions, if not billions, of data objects.

Data Center #1 102 is provided with at least the directory information of Bucket-001 310 from the database 105, which is translated into the public protocol that can then be viewed and accessed by the first end-user 106. The first end-user 106 is then equipped to upload data objects, such as Data Object A 103, to the web address associated with Data Center #1 102, step 412. The first end-user 106 is provided (by the cloud 101) with a response to the PUT request, step 414. Though FIG. 4 lays out a simplified method of providing access and directory information to the first end-user 106, there can be any number of back-and-forth communication between the public cloud 101 and Data Center #1 102 and between Data Center #1 102 and the first end-user 106 (and the local computer used by the first end-user 106). As previously discussed, certain embodiments envision stateless communication transactions (though not limited to stateless communication transactions) wherein each transaction is wrapped in authentication codes, such as in REST protocol. Certain embodiments envision a single transaction between Data Center #1 102 and the public cloud 101 to receive all of the authentication and data directory information retained in the database 105. Also, in the present embodiment Data Center #1 102 has no knowledge that Data Object A 103 even resides in Data Center #1 102 because the data directory information is retained in the public cloud 101 and not in Data Center #1 102. FIG. 1 depicts Data Object B 125 uploaded to Data Center #3 122 by the third end-user 120 in more or less the same manner as described in the method of FIG. 4.

Figure 5:
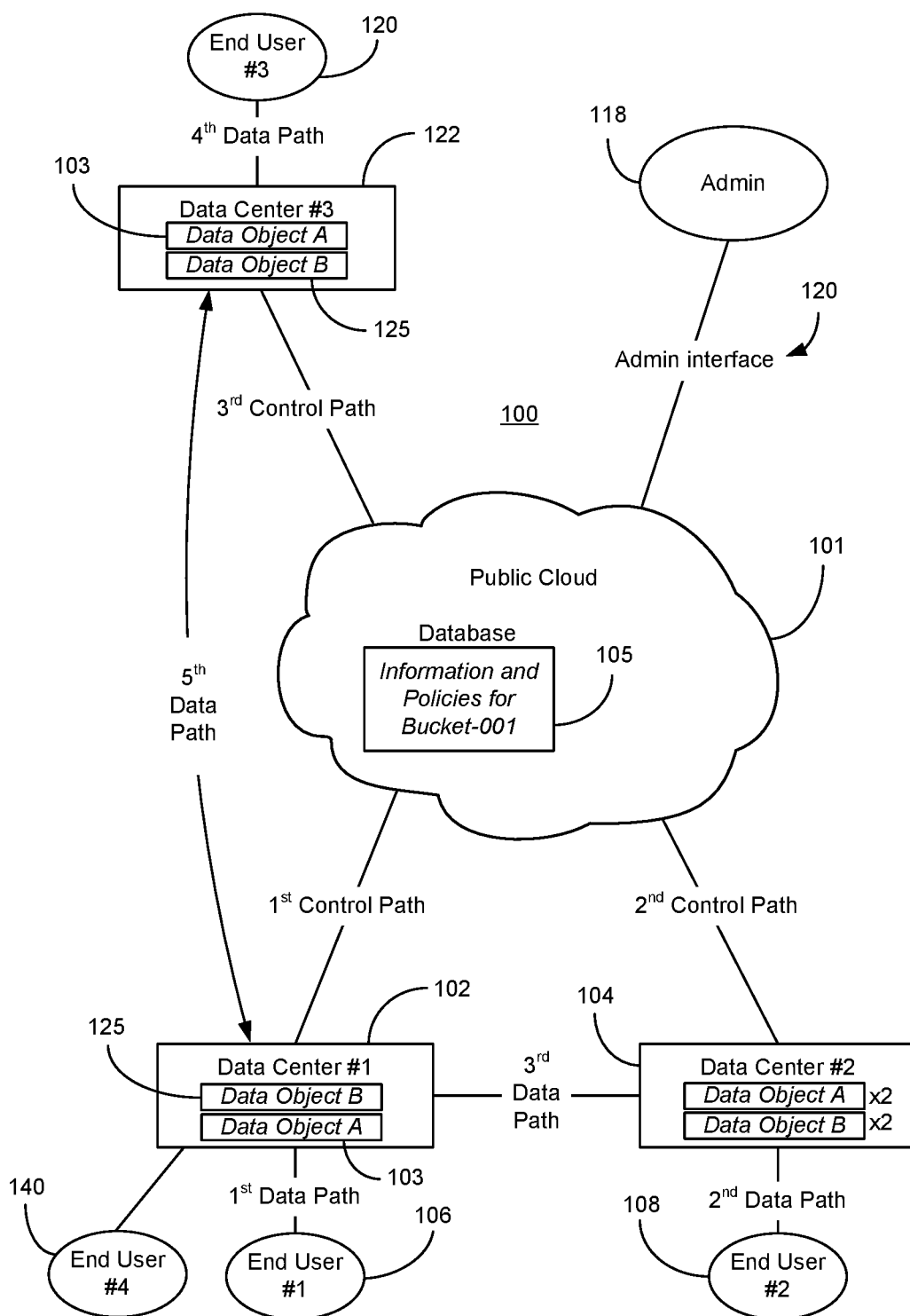
FIG. 5 depicts a block diagram of a storage system embodiment consistent with embodiments of the present invention.

According to the policies set up for Bucket-001 310, after Data Object A 103 is uploaded to Data Center #1 102 (from the first end-user 106), Data Object A 103 is replicated at Data Center #3 122, and two copies of Data Object A 103 are made at both Data Center #2 104 in both "hot" and "warm"

storage. Likewise, after Data Object B 125 is uploaded to Data Center #3 122, Data Object B 125 is replicated at Data Center #1 102 in "hot" storage, and two copies of Data Object B 125 are generated at Data Center #2 104 and at one copy at Data Center #3 122. As depicted in FIG. 5, replication of Data Object B 125 from Data Center #3 122 to Data Center #1 102 is accomplished by way of the fifth data path, bypassing the public cloud 101. Likewise, replication of Data Object A 103 from Data Center #1 102 to Data Center #3 122 is also accomplished by way of the fifth data path. In this way, the data objects are not stored to the public cloud 101 and accordingly there is no data charges from the public cloud 101. Certain embodiments envision the replication policies in the Bucket-001 database 105 being transmitted from the public cloud 101 to either Data Center #1 102, Data Center #3 122, or both whereby the Data Center/s 102 and 122 execute replication policies once in possession of these policy instructions. Also, consistent with the policies set up for Bucket-001 310, two copies of Data Object A 103 and Data Object B 125 are generated and retained in Data Center #2 104. It is further envisioned that the public cloud 101 does not direct the replication policies (and redundancy policies), rather the public cloud 101 merely transmits the policies to the data center whereby the data center executes actions based on the policies. Certain other embodiments envision the data centers pulling the policy information from the public cloud 101. Yet other certain embodiments envision an application either in the public cloud 101, or elsewhere, providing policy updates to the data centers at either specific time intervals or optionally when anything, such as new data object metadata, has been added to the database 105. It is further envisioned that policies transmitted by the public cloud 101 to a data center are held in buffer until the data centers carry out the policies and then are deleted by the data centers. Yet other embodiments envision that when policies are carried out, records pertaining to carrying out the policies (i.e., confirming that the policies have been carried out) are transmitted to the database 105 (or another database within the public cloud).

Figure 6:
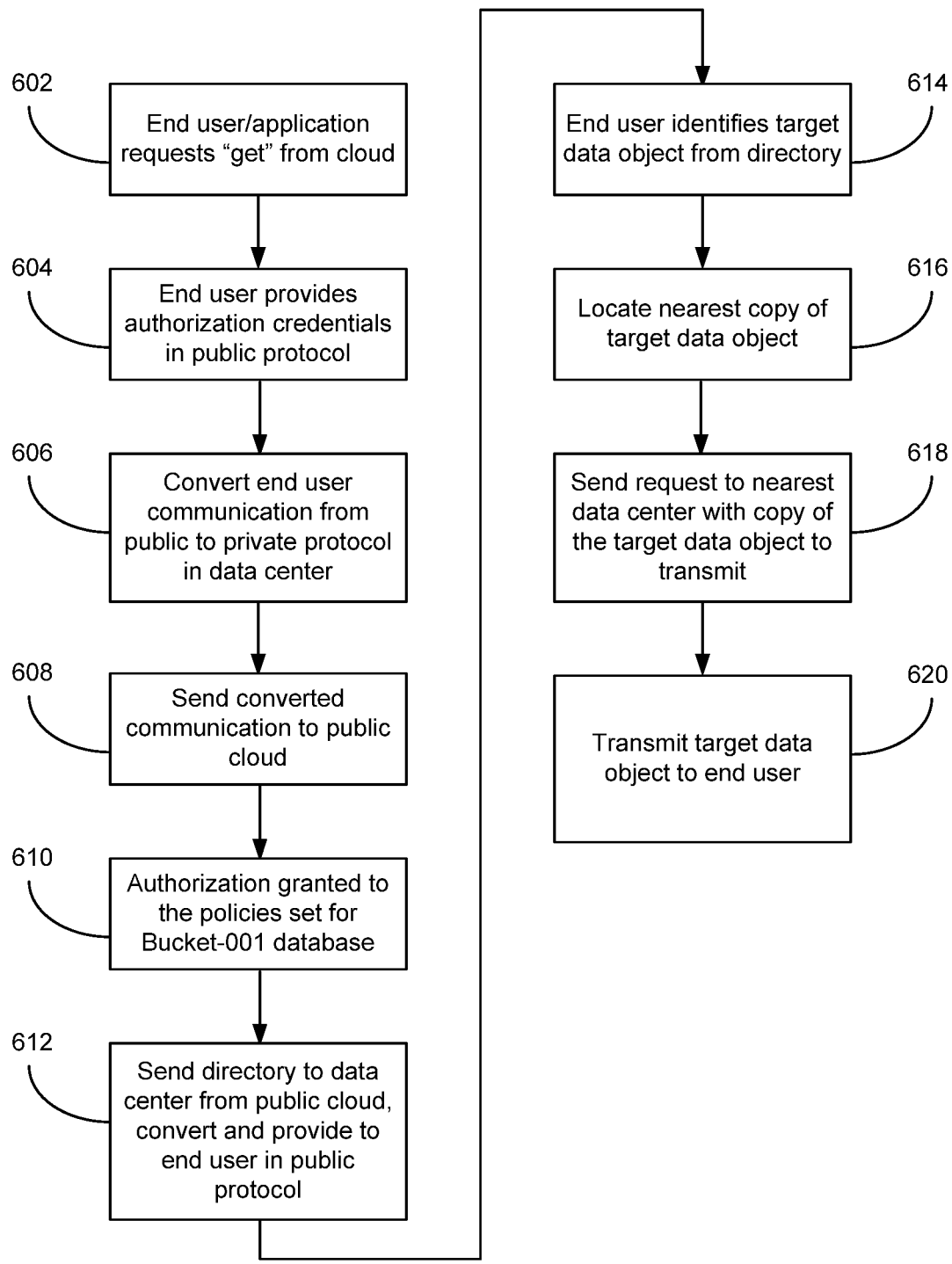
FIG. 6 is a method for retrieving data objects by end-users consistent with embodiments of the present invention.

FIG. 6 is a method for retrieving data objects by end-users, considered a "get" herein, consistent with embodiments of the present invention. In this example, FIG. 6 is described in view of FIG. 5. Assuming that the second end-user 108 wants to gain access to Bucket-001 310, the second end-user 108 (by way of a local computer) connects to Data Center #2 104 by way of a second web address. Certain optional embodiments contemplate using a common web address for all data centers in the cloud network storage arrangement. In this example, the second end-user 108 is a person/operator connected to Data Center #2 104 by way of the second data path, however, other embodiments contemplate the second end-user 108 being an application that automatically links to the second web address to perform storage operations (such as a server). The second end-user 108 does not necessarily know that they are connecting to Data Center #2 104, rather the second end-user 108 simply knows that there is storage behind the second web address containing data objects. Certain embodiments contemplate that the second web address appears to the second end-user 108 as the public cloud, even though it is not. The second end-user 108 communicates with Data Center #2 104 by way of an interface program that in certain embodiments is a private interface program, such as S3. In step 602 the second end-user 108 makes a request to enter the cloud network storage arrangement 100 via the second web address operating through a stateless connection using REST protocol with Data Center #2 104 for purposes of getting a data object. As previously discussed, the stateless connection requires authorization with every communication transaction with Data Center #2 104 because after each transaction the communication link is closed. Again, this is accomplished by the local computer wrapping authorization codes associated with the second end-user 108 with each data communication transaction that it transmits. However, the second end-user 108 being logged into a local computer may not know that communication is by way of REST protocol. Other embodiments envision a connection that is not stateless whereby the second end-user 108 has an open link with Data Center #2 104.

Based on the policies set up by the administrator 118 (depicted in FIG. 3B), the second end-user 108 is allowed to enter their local computer by way of medium level security, which could be a username and password, for example, step 604. In turn, the local computer connects with Data Center #2 104 by way of the authentication codes discussed previously. Certain embodiments contemplate the second end-user 108 being allowed to enter the network in optional ways, such as by way of their computer with simply an IP address or a different username and password.

Here, the second end-user 108 (by means of accessing their local computer) communicates with Data Center #2 108 over the second data path via a private interface program/protocol, but Data Center #2 108 communicates with the public cloud 101 over the second control path via a private control protocol that is different from the private protocol. Accordingly, the computer system in Data Center #2 104 must convert the information received from the second end-user 108 in the public protocol into the private control protocol arranged in a way that the public cloud computer system (not shown) can understand, step 606. The converted information, along with authentication, provided by the second end-user 108 is then transmitted to the public cloud 101, step 608. Hence, the second end-user 108 communicates with Data Center #2 108 by way of a public interface program (such as, S3) via the second data path and Data Center #2 108 communicates with the public cloud 101 by way of a private control protocol via the second control path. The request to enter the cloud network storage arrangement 100 and any authentication codes may need to be translated to the control protocol by Data Center #2 108.

Based on the permission policy 316 originally set up by the administrator 118 (which is stored in the public cloud 101 for Bucket-001 database 105), assume the second end-user 108 is authorized to view the directory contents (list) of Bucket-001 105 as depicted by the permission tab 316, step 610. In this embodiment, Bucket-001 directory, which is not local to Data Center #2 104, is transmitted from the public cloud 101 to Data Center #2 104 by way of the second control path in the private control protocol and translated in Data Center #2 104 to the public interface protocol for the viewing benefit of the second end-user 108, step 612. Accordingly, the second end-user 108 may view a list of all of the data objects, i.e., Data Object A 103 and Data Object B, in Bucket-001 database 105 that are transmitted in buffered memory to the Data Center #2 108 for short term retention before being deleted (perhaps minutes or hours, or optionally when the second end-user 108 logs out/closes the connection with Data Center #2 108, for example). After identifying the data objects in the data directory to Bucket-001 310, the second end-user 108, for example may want to access Data Object A 103, step 614.

Figure 7A:
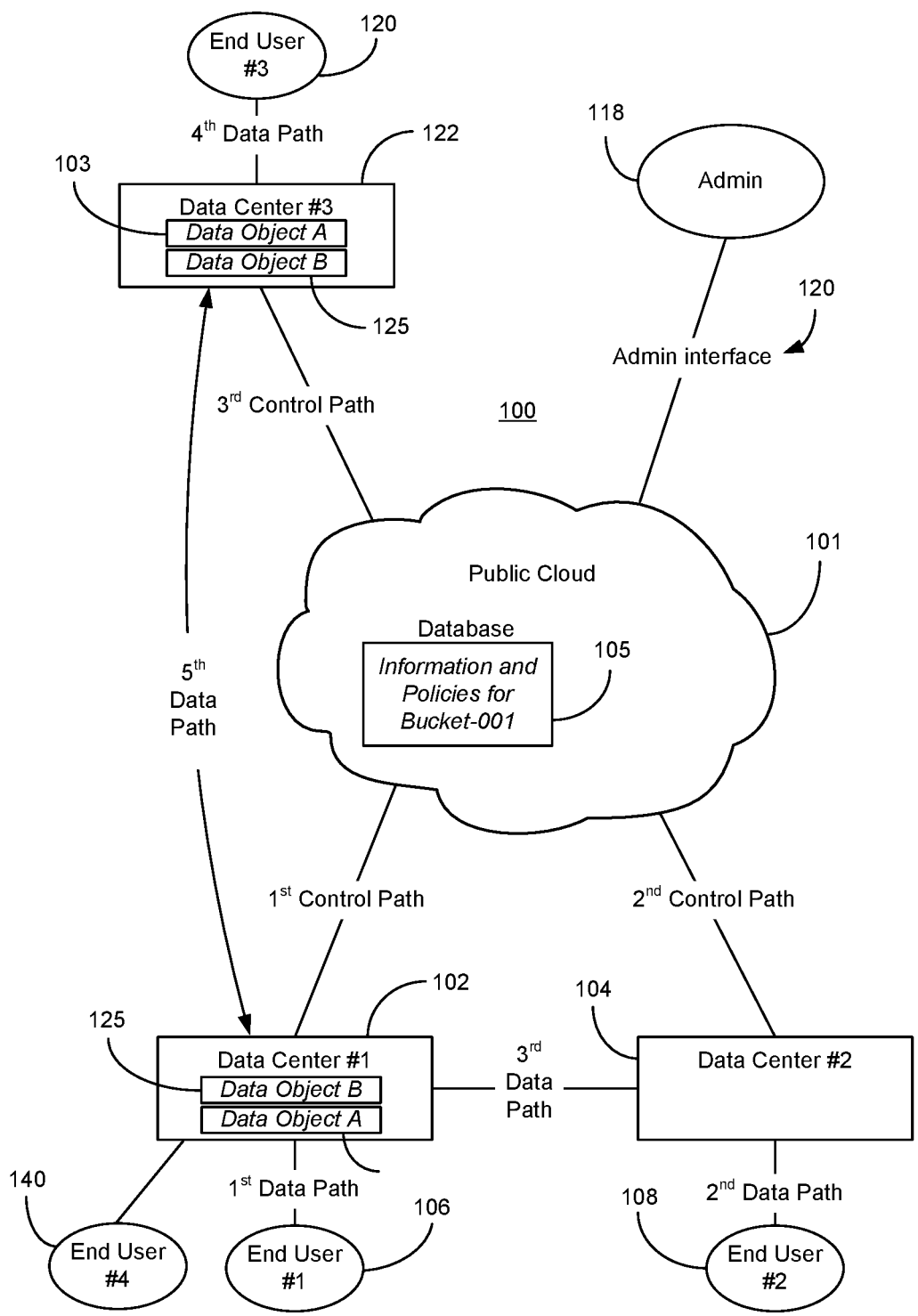
FIGS. 7A-7B depicts a block diagram of a storage system embodiment consistent with embodiments of the present invention.

Though FIG. 5 depicts all of the data centers possessing both Data Object A 103 and Data Object B 125, consider a scenario where Data Center #2 108 has no local copy of either Data Object A 103 or Data Object B 103, depicted in FIG. 7A. In this scenario, because Data Object A 103 is not local to Data Center #2 104, the directory information including location and other meta data provided by the public cloud 101 indicates that the closest copy of Data Object A 103 is retained in Data Center #1 102, step 616. In order to retrieve Data Object A 103 from Data Center #1 102, Data Center #2 104 informs Data Center #1 102 (over the third data path) that Data Object A 103 is in Data Center #1 102 (because in the present embodiment Data Center #1 102 does not maintain a local directory) and to send Data Object A 103 to Data Center #2 104 over the third data path, step 618.

Figure 7B:
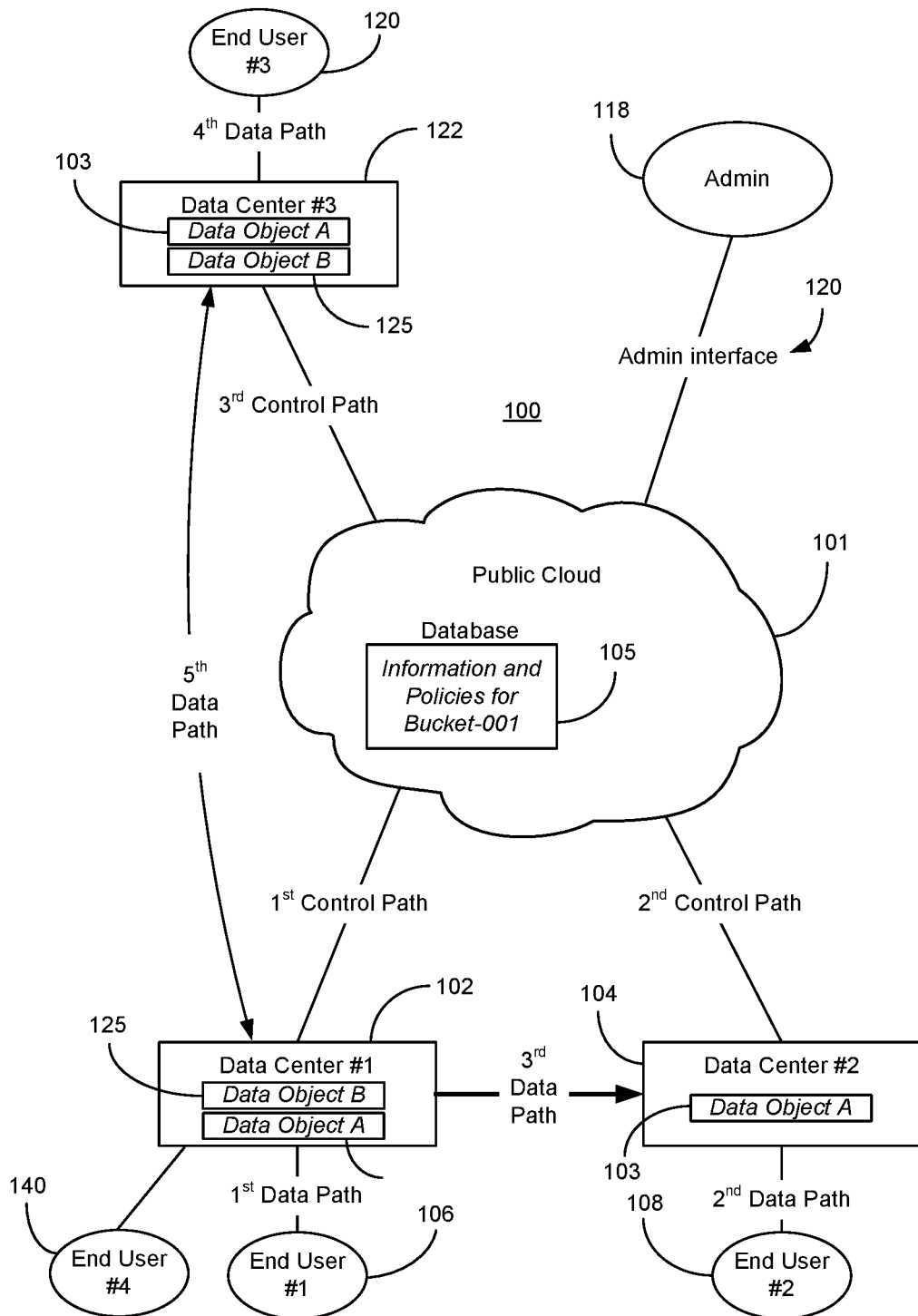

As shown in FIG. 7B, in response to the request, Data Center #1 102 transmits Data Object A 103 to Data Center #2 104 over the third data path, step 620. This can be considered a "pull operation" whereby Data Center #2 104 pulls Data Object A 103 from Data Center #1 102. Transmission of Data Object A 103 by way of the third data path eliminates uploading Data Object A 103 to the public cloud and then downloading Data Object A 103 to Data Center #2 104, which eliminates all financial upload and download charges that accompany using a public cloud. In other words, the public cloud 101 is bypassed from touching the actual data objects. Certain embodiments contemplate data object/s (or copies of the data object/s) never being loaded or retained whatsoever in the public cloud 101. Other embodiments contemplate an abbreviated portion (a "snippet") of a data object or objects being retained in the public cloud. Yet other embodiments contemplate a thumbnail representation (or some other abbreviated representation) of a data object being stored to the public cloud. The idea behind this is that there will not be a large amounts of data stored to the public cloud 101, thus avoiding incurring any substantial charges due to the small size of the thumbnail, for example. Other embodiments contemplate less than 10% of a data object being stored to the public cloud to limit charges, but provide an idea of what the data object is about. Certain embodiments contemplate retaining the meta-data about the objects in the public cloud whereby the meta-data is searchable to find objects that meet particular criteria, such as date, editor, location, content, etc. Once Data Object A 103 is in Data Center #2 104, the second end-user 108 can read Data Object A 103. Certain embodiments contemplate Data Object A 103 simply streaming through Data Center #2 104 to the second end-user 108, without being stored in Data Center #2 104. Certain other embodiments contemplate Data Center #2 104 merely being a conduit for streaming Data Object A 103 to the second end-user 108 based on not having sufficient storage space to retain Data Object A 103 (e.g., Data Center #2 104 functions more or less as a simple node to access the system 100). After Data Object A 103 is transferred to Data Center #2 104, the location information is cleared from any buffer in Data Center #2 104. If Data Object A 103 is retained in memory in Data Center #2 104, the database 105 for Bucket-001 is updated with additional location information and/or migration activity (records of storage related activity involving an object), however that information will not be retained in memory long-term in Data Center #2 104. Yet in another embodiment, if Data Object A 103 is not retained in memory in Data Center #2 104, but rather just passes through Data Center #2 104. Information retained in short-term memory is retained for enough time (for efficiency purposes) for an end-user that is actively accessing information that would otherwise be retained solely in the database 105 during the length of time (tenure) that Data Object A 103 is retained in the Data Center #2. This could be only during a time span where an end-user is logged in to their local computer, which is engaging in transactions with the network cloud storage arrangement 100, or optionally if the end-user is accessing that information every few hours to every day, for example. Certain embodiments envision that after a couple of days or even a week the database information retained in short-term memory in a data center will be deleted.

In the above embodiments, Data Center #1 102, Data Center #2 104, and Data Center #3 122 are described as having independent web addresses, however certain embodiments contemplate one single web address for all of the data centers in the network. In certain instances, an end-user would be directed to a data center that is geographically closest to the end-user by way of location metadata transmitted to one of the data centers from the public cloud database 105 whereby the data center in possession of the location metadata coordinates communication with the closest geographic data center. Other instances can take advantage of AWS for better geographically matching location of a data center with an end-user. For example, if Data Center #1 102 is located in Boston, Data Center #2 104 is located in Denver, and Data Center #3 122 is located in Seattle, then an end-user located in Burlington, Vt. would automatically be routed to interact with Data Center #1 102. Similarly, an end-user located in Vancouver would be routed to interacting with Data Center #3 122. In this way, data objects uploaded, downloaded or simply read by an end-user would benefit from a closer point of contact in both time and reliability.

Figure 8A:
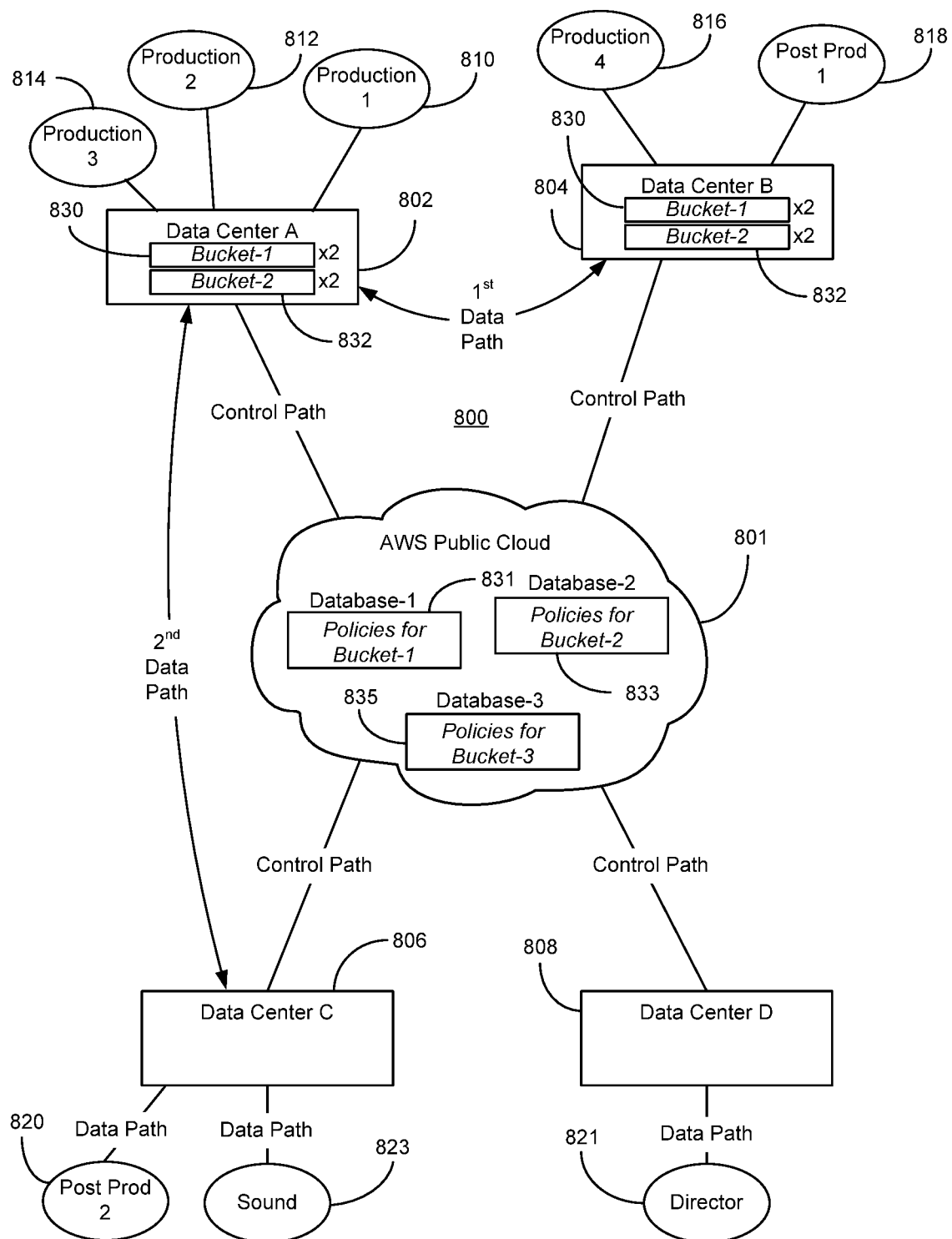
FIGS. 8A-8C depict a commercial environment in which embodiments of the present invention can be practiced consistent with embodiments of the present invention.

Embodiments of the present invention can be practiced in a cloud network storage arrangement including data storage products produced manufactured by Spectra Logic Corporation of Boulder, Colo., such as Spectra Logic's White Pearl storage server, Black Pearl storage server and T-950 tape libraries linked to AWS cloud computing services provided by Amazon Corporation of Seattle, Wash. In one exemplified embodiment, consider the basic process of filming a movie, 1) production is the film generated with actors on a set; 2) post production is to include special-effects, dubbing, adding music, etc.; 3) directors cut and final editing, and 4) distribution (widely and broadly distribute the movie). As depicted in FIG. 8A, there are four data centers in different geographic locations Data Center A 802 in Los Angeles, Data Center B 804 in Seattle, Data Center C 806 in New York, and Data Center D 808 Denver. All of the data centers are linked to AWS (public) cloud computing services. Assuming an administrator previously set up policies whereby data bucket security authorization is required for each end-user, according to the policies, Production end-users 1-4 810-816 are only authorized to upload data objects into Bucket-1 830, Post Production end-users 1 and 2 818, 820 are authorized to download from Bucket-1 830 and upload and download from Bucket-2 832, and a Director is authorized to upload and download all buckets associated with the film and store the director's cut data objects to Bucket-3 834.

Figure 8B:
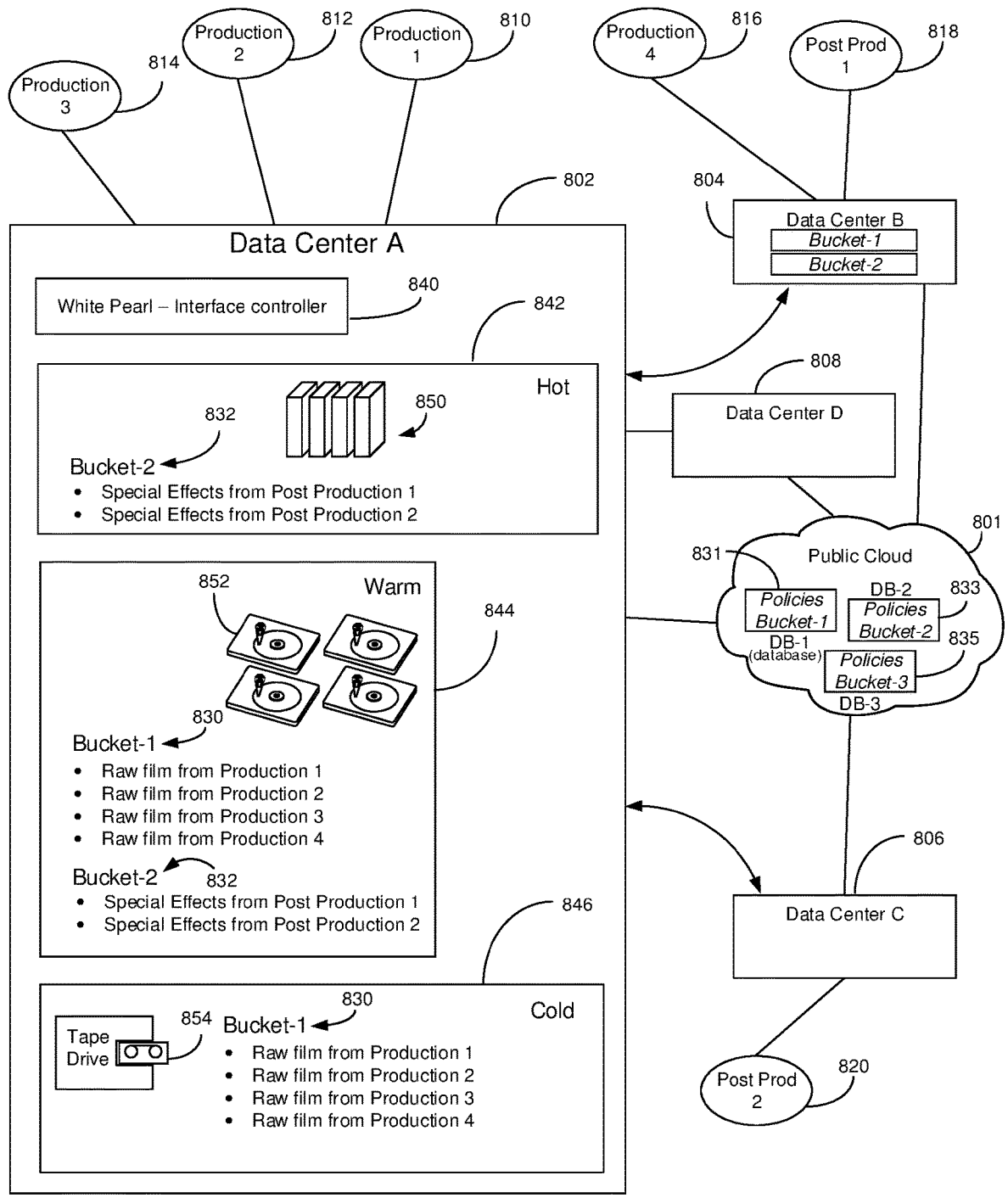

As depicted in FIG. 8B, Bucket-1 830 initially resides in Data Center A 802 with one copy in "warm" storage on HDD 852 and one copy in "cold" storage 846 on tape 854. One embodiment contemplates Data Center B 804 configured to store copies of Bucket-1 830 in the same manner as in Data Center A 802, however Data Center B 804 may possess any number of different storage devices, which may include "hot" 842, "warm" 844, and "cold" storage 846, that are different than Data Center A 802. Data Center C 806 and Data Center D 808 do not retain local copies of Bucket-1

830 or Bucket-2 832 (at this point in time). Data Center A 802 retains Bucket-2 832 in both "hot" SSD memory 850 and "warm" HDD memory 852. Data Center B 804 retains two copies of Bucket-2 832, which could be stored to the same kind of memory as in Data Center A 802 or completely different memory. The AWS public cloud 801 maintains the policies for Bucket-1 830, Bucket-2 832, and Bucket-3 834.

In this commercial embodiment, the Spectra Logic White Pearl interface controller 840 functions as the "brains" behind a data center managing the S3 cloud storage with the end-users and communicates with the AWS public cloud 801 by managing the control path communication. The White Pearl interface controller 840 possess the necessary computing power and multiplexing capability to route communication between the public cloud 801 and end-users as well as other White Pearls/data centers. The White Pearl interface controller 840 is programmed to translate communication and interface with S3 communication protocol and a private communication protocol with the AWS public cloud 801. Additionally, the White Pearl interface controller 840 manages and executes replication protocol and other activities within the storage system that can be comprised in a data center.

With continued reference to both FIGS. 8A and 8B, three separate production cameras produce raw film, Production-1 810 in Huntington Beach, Calif., Production-2 812 in Ventura, Calif., and Production-3 814 in San Diego, Calif. Production-1 810 logs into a local computer by way of a username and password, which after being connected looks like accessing a standard S3 cloud computing system (using an S3 protocol). The local computer manages a stateless REST protocol connection wrapping every communication transaction with authentication codes when communicating with Data Center A 802 (which is a private data center, as are all in this embodiment, that is independent from the public cloud 801). Data Center A 802 gains authentication with the AWS public cloud 801 for each communication transaction with the authentication codes (either "as is" or altered for communication purposes). Certain embodiments contemplate that if Production-1 810 is near Los Angeles but originally connecting to a different Data Center, Production-1 810 (the end-user) is rerouted to be linked to Data Center A 802. Data Center A 802, through a Spectra Logic White Pearl interface controller/router 840, converts all necessary information sent by Production-1 810 in the S3 protocol to a private control protocol and routs information back and forth between the AWS public cloud and Production-1 810. Though a number of back-and-forth transactions can be made between Data Center A 802 (White Pearl interface controller/router system 840) and the public cloud 801, one embodiment contemplates a single transaction whereby the public cloud 801 authenticates Production-1 810 to access Bucket-1 830 according to the policies set up for Bucket-1 830. Having access to Bucket-1 830, Production-1 810 uploads ("put") raw film (perhaps taken that day) to Bucket-1 830. Production-2 812 and Production-3 814 are closer to Data Center A 802 than any other data center so commence in being authenticated to upload raw film in a similar fashion as Production-1 810. Importantly, the raw film data objects neither pass through nor are uploaded to the public cloud 801. The public cloud 801 merely manages and retains the policies and the data object directories (and other pertinent metadata). Any new meta data generated through actions by the end-users, such as Production-1 810, is added to the AWS public cloud database (database-1 831) containing Bucket-1 metadata and policies.

Production-4 816 from Vancouver, Canada accesses what looks like the public cloud via the same web address as Production-1 810 (by way of a White Pearl interface controller), but based on the geographic location of Production-4 816, Production-4 816 is rerouted by AWS to access Data Center B 804 located in Seattle, Wash. Similarly, Production-4 816 logs into their local computer to what looks like a standard S3 cloud computing system (using an S3 protocol) by way of the same web address used by Production-1 810—authorized with a username and password. Data Center B 804 converts all necessary information sent by Production-4 816 in the S3 protocol to the private control protocol by way of a White Pearl interface controller. Once authenticated to have access to Bucket-1 830, Production-4 816 uploads raw film to Bucket-1 830. The metadata for the data objects uploaded to Bucket-1 830 including location information are added to the database for Bucket-1 831. Based on the replication policies set up the database for Bucket-1 831, the data objects of Bucket-1 830 are replicated in Data Center B 804. As previously mentioned, certain embodiments contemplate the data centers rolling replication based on the instructions from database-1 831 retained in the public cloud 801. This could be done prior to Production-4 816 uploading data objects to Bucket-1 830 or after. Optionally, Bucket-1 830 can be constructed coincidently in both Data Center A 802 and then Data Center B 804 with all objects in Bucket-1 802 being harmonized in both data centers 802 and 804 (that is all of the data objects in Bucket-1 802 synchronizing across both data centers 802 and 804).

Based on the data redundancy policies implemented (temporarily in possession of at least Data Center A 802) for Bucket-1 831 retained by the public cloud 801, two copies of all of the data objects (raw film) from Productions 1-4 are generated in both Data Center A 802 and Data Center B 804. The White Pearl interface controller 840 of Data Center A 802 directs raw film from Productions 1-4 be stored to "warm" storage—HDD and to "cold" storage-tape media 854. Bucket-1 831 can be migrated from the HDD to additional tape storage for redundancy after a predetermined amount of time set up by the administrator (such as 180 days, for example).

Postproduction in this example is accomplished by specialists that edit the raw film (uploaded as data objects from production), add special effects, add music, add color, etc. First, postproduction end-users 818 and 820 and sound manager 823 (which for purposes of description with just be postproduction end user 820) log into their local computers using their usernames and passwords. The local computers connect to their data centers respectively, 804 and 820, by way of the web address associated with Bucket-1 830 and Bucket-2 832 using REST protocol. Because postproduction-1 818 is nearest Seattle (perhaps Bellview, Wash.), postproduction-1 818 is linked to Data Center B 804 and because postproduction-2 820 is nearest New York (perhaps Boston, Mass.), postproduction-2 820 is linked to Data Center C 806. Data Center B 804 and Data Center C 806 receive the respective authentication codes wrapped with each transaction from the local computers used by postproduction-1 818 and postproduction-2 820 in the public S3 protocol and converts the transactions into the private protocol for consumption by the AWS public cloud 801. Assuming there is one transaction between each of the data centers 804 and 806 and the AWS public cloud 801, the AWS public cloud furnishes Data Center B 804 and Data Center C 806 with authorized data directories associated with Bucket-1

830 and Bucket-2 832, which can be presented or used by the postproduction end-users 818 and 820.

Figure 8C:
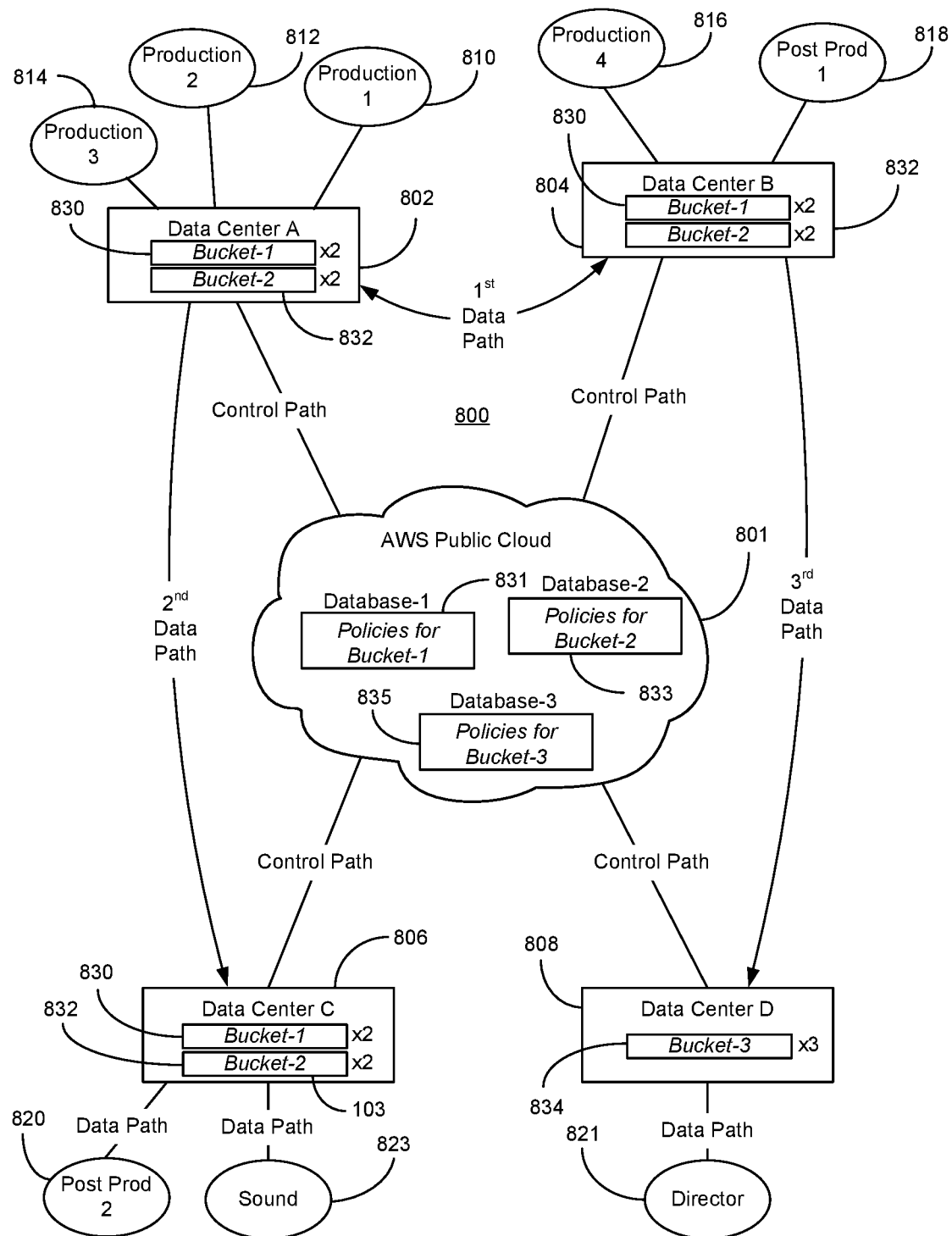

As depicted in the embodiment of FIG. 8C, when postproduction end-user 2 820 requests downloading ("pull") at least one of the raw film data objects from Bucket-1 830, Data Center C 806 asks the AWS public cloud 801 where Bucket-1 830 is located because the data directory and location information for Bucket-1 830 is retained in the AWS public cloud 801 and not in the individual data centers. Once furnished with the data directory location information, Data Center C 806 identifies that the closest location of Bucket-1 830 is in Data Center A 802 and informs Data Center A 802 that it possesses Bucket-1 830 (and where Bucket-1 830 resides in Data Center A 802) and request transmission of Bucket-1 832 to Data Center C 806. After receiving Bucket-1 830 from Data Center A 802, postproduction-1 820 can download the raw film data objects uploaded by Production 1-4 810-816. Certain embodiments envision the data objects of Bucket-1 being streamed through Data Center C 806 instead of being stored in Data Center C 806. As mentioned earlier, postproduction-2 802 edits the raw film, for example keeping only the compelling shots, adding color, perhaps special effects, etc. and then uploads ("put") one or more edited film objects into Bucket-2 832. Bucket-2 832 may be generated in Data Center C 806 based on postproduction 2 820 uploading one or more data objects into Bucket-2 832 and then synchronized (synced) with all other data objects in Bucket-2 in the other data centers using the AWS public cloud 801 to provide location information of the appropriate data objects in Bucket-2 832. Optionally, Bucket-2 832 is transferred to Data Center C 806 based on a request to transfer over the data path linking Data Center A 802 with Data Center C 806, and then synced with all other data in Bucket-1 832. Certain embodiments contemplate a record maintained of all these activities retained in database-1 831 or elsewhere in the AWS public cloud 801.

Similarly, postproduction end-user 1 818 being closest to Data Center B 804 is free to download any of the data objects from Bucket-1 830 after being granted access to enter the cloud storage network arrangement 800. Postproduction end-user 1 818 can then transmit edits to the raw film as new data objects in Bucket-2 832. The AWS public cloud 801 based on policies set up by the administrator can send instructions to the appropriate data centers to sync all of the data objects in Bucket-2 832 across the different data centers by way of the White Pearl interface controller/s 840. As previously mentioned, all of the data objects are transferred amongst the data centers by way of the linking data paths without ever passing through the AWS public cloud 801. The policy set in AWS public cloud 801 may be set up with directions that if a data bucket resides in any one data center, a duplicate copy will be made in that data center as depicted in FIG. 8C. Optionally, the administrator can go back and alter the policies in Data Center C 806 to duplicate all buckets residing in Data Center C 832, for example. All completed actions can be retained in the public cloud 801, and not in long-term storage (if even stored at all for even a brief amount of time) in the data centers.

After the postproduction edits have been uploaded to Bucket-2 832, the director 821 (located in Boulder, Colo.), being granted authorization to enter the cloud storage network arrangement 800, requests downloading all of the contents in Bucket-2 832. Because the director 821 is closest to Data Center D 808 located in Denver, the director 821 communicates with the cloud storage network arrangement 800 by way of Data Center D 808. As depicted in FIG. 8C, Bucket-2 832 is not local to Data Center D 808. The director 821 has no idea that there are different data centers, let alone different buckets in different data center locations. However, the AWS public cloud 801 provides Data Center D 808 with the closest location of Bucket-2 832, which is in Data Center B 804. Data Center D 808 sends a message to Data Center B 804, over the $3_{rd}$ data path, that Bucket-2 832 is local to Data Center B 804 (and even where it is in Data Center B 804) and to send Bucket-2 832 over the $3_{rd}$ data path ("get"). Accordingly, Center B 804 sends Bucket-2 832 to Data Center D 808 over the $3_{rd}$ data path. In the present embodiment, Bucket-2 832 is not retained in permanent storage at Data Center D 808, rather Bucket-2 832 is merely streamed through Data Center D 808 to the director 821. An optional embodiments, Bucket-2 832 is made local and storage at Data Center D 808. Once the director 821 is in possession of the data objects in Bucket-2 832, the director 821 can edit the postproduction objects and upload the director's cut into Bucket-3 834 which resides in Data Center D 808. According to the policies set by the administrator, all objects in Bucket-3 834 are saved in triplicate. Location, and other metadata and the transaction records made by the director can be maintained by the public cloud 801.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, though a web address is used as a target for entering the network cloud storage arrangement 100, some other pointer or address could equally be used while still maintaining substantially the same functionality without departing from the scope and spirit of the present invention. Another example can include using private communication protocol on both control paths and data paths or public communication protocol on both control paths and data paths to eliminate any conversion while still preserving bypassing sending the main data objects into the public cloud. Yet another example can include that though the "brains" of the data center is a controller/router system with the appropriate functional supporting hardware and software, which functionality can be spread out in multiple components within the database while staying within the scope and spirit of the present invention. Further, the terms "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:
1. A hybrid cloud network data handling method comprising:
   providing a public cloud communicatively linked to a private data center, the private data center comprising a data bucket defined in non-transient mass storage and a data object retained in the data bucket, the data object not present in the public cloud;

the public cloud locating the data object via data object location information located in the public cloud, the data object location information not present in the private data center.

2. The hybrid cloud network data handling method of claim 1 further comprising an end-user entering the hybrid cloud network and requesting access to the data object.

3. The hybrid cloud network data handling method of claim 2 further comprising in response to the request, the private data center locating the data object from the data object location information located in the public cloud.

4. The hybrid cloud network data handling method of claim 3 further comprising the private data center asking the public cloud if the data object is in the public cloud and if so providing the data object location information.

5. The hybrid cloud network data handling method of claim 3 further comprising the private data center obtaining the data object location information from the public cloud.

6. The hybrid cloud network data handling method of claim 5 further providing the end-user with access to the data object.

7. The hybrid cloud network data handling method of claim 1 wherein the data bucket is not present in the public cloud.

8. The hybrid cloud network data handling method of claim 1 further comprising locating the data object on behalf of a client entering the public cloud.

9. The hybrid cloud network data handling method of claim 1 wherein the data object is never present in the public cloud.

10. A storage arrangement comprising:
a public cloud communicatively linked to a private data center comprising nontransient mass storage;
a data bucket defined in the nontransient mass storage;
a data object stored in the data bucket, the data object not present in the public cloud; and
data object location information located in the public cloud but not in the private data center, the data object unable to be located without the data object location information.

11. The storage arrangement of claim 10 further comprising an end-user communicatively linked to the storage arrangement; and an access request configured to access the data object, the access request previously sent by the end-user and in possession of the private data center; the access request unable to be fulfilled by the private data center without the data object location information.

12. The storage arrangement of claim 11 wherein at least a portion of the data object location information can temporarily exist in the private data center, but only after the access request.

13. The storage arrangement of claim 10 further comprising data bucket handling policies for the data bucket, the data bucket handling policies are located in the public cloud but not in the private data center.

14. The storage arrangement of claim 10 wherein the data object is defined by a block size, the block size is defined by a predetermined number of data bits.

15. The storage arrangement of claim 10 wherein further comprising a data bucket directory information located in the public cloud but not located in the private data center.

16. A method of using a hybrid cloud network, the method comprising:
providing a public cloud service linked to a private data center, a data object stored in the private data center but not in the public cloud service;
entering the hybrid cloud network via the private data center;
requesting access to the data object;
after the requesting step, the private data center determining that the data object is located locally in the private data center after receiving location information for the data object from the public cloud service, no location information for the data object is located at the private data center; and
after the determining step, giving access to the data object.

17. The method of claim 16 wherein the entering step and the requesting step is made by an end-user.

18. The method of claim 17 wherein the end-user is unaware of the public cloud service but is unaware of the private data center.

19. The method of claim 16 wherein the data object resides in a data bucket that is defined storage space in the private data center.

20. The method of claim 16 wherein the entering step is accomplished via a web address that is uniquely tied to the private data center.

* * * * *